United States Patent [19]

Yanagisawa

[11] Patent Number: 5,477,743
[45] Date of Patent: Dec. 26, 1995

[54] TWO DIMENSIONAL DRIVE SYSTEM

[75] Inventor: Ken Yanagisawa, Matsumoto, Japan

[73] Assignee: Yugen Kaisha Sozoan, Nagano, Japan

[21] Appl. No.: 288,870

[22] Filed: Aug. 10, 1994

[30] Foreign Application Priority Data

Sep. 3, 1993 [JP] Japan .................. 5-219495

[51] Int. Cl.⁶ .............. G05G 11/00; B25J 5/04
[52] U.S. Cl. ............ 74/490.09; 33/1 M; 108/20; 108/143; 248/661
[58] Field of Search ............ 74/490.09; 33/1 M; 108/20, 143; 248/661

[56] References Cited

U.S. PATENT DOCUMENTS

| 3,764,900 | 10/1973 | Baldwin | 33/1 M |
| 4,176,455 | 12/1979 | Copeland et al. | 33/1 M |
| 4,995,227 | 2/1991 | Yanagisawa | 74/89.15 |
| 5,279,178 | 1/1994 | Yanagisawa | 74/490.09 |

Primary Examiner—Allan D. Herrmann
Attorney, Agent, or Firm—Birch, Stewart, Kolasch & Birch

[57] ABSTRACT

The object of the of the present invention is to provide a two dimentional drive system having a small and simple structure. The two dimensional drive system comprises: a first lever whose one end is fixed to a first shaft; a second lever whose one end is fixed to a second shaft; a third lever whose one end is fixed to a third shaft; a fourth lever whose one end is fixed to a fourth shaft; a first moving guide whose one end is rotatably connected to the other end of the first lever and whose the other end is rotatably connected to the other end of the second lever; a second moving guide whose one end is rotatably connected to the other end of the third lever and whose the other end is rotatably connected to the other end of the fourth lever; and a moving body being capable of moving on the first moving guide and the second moving guide.

13 Claims, 3 Drawing Sheets

FIG.2
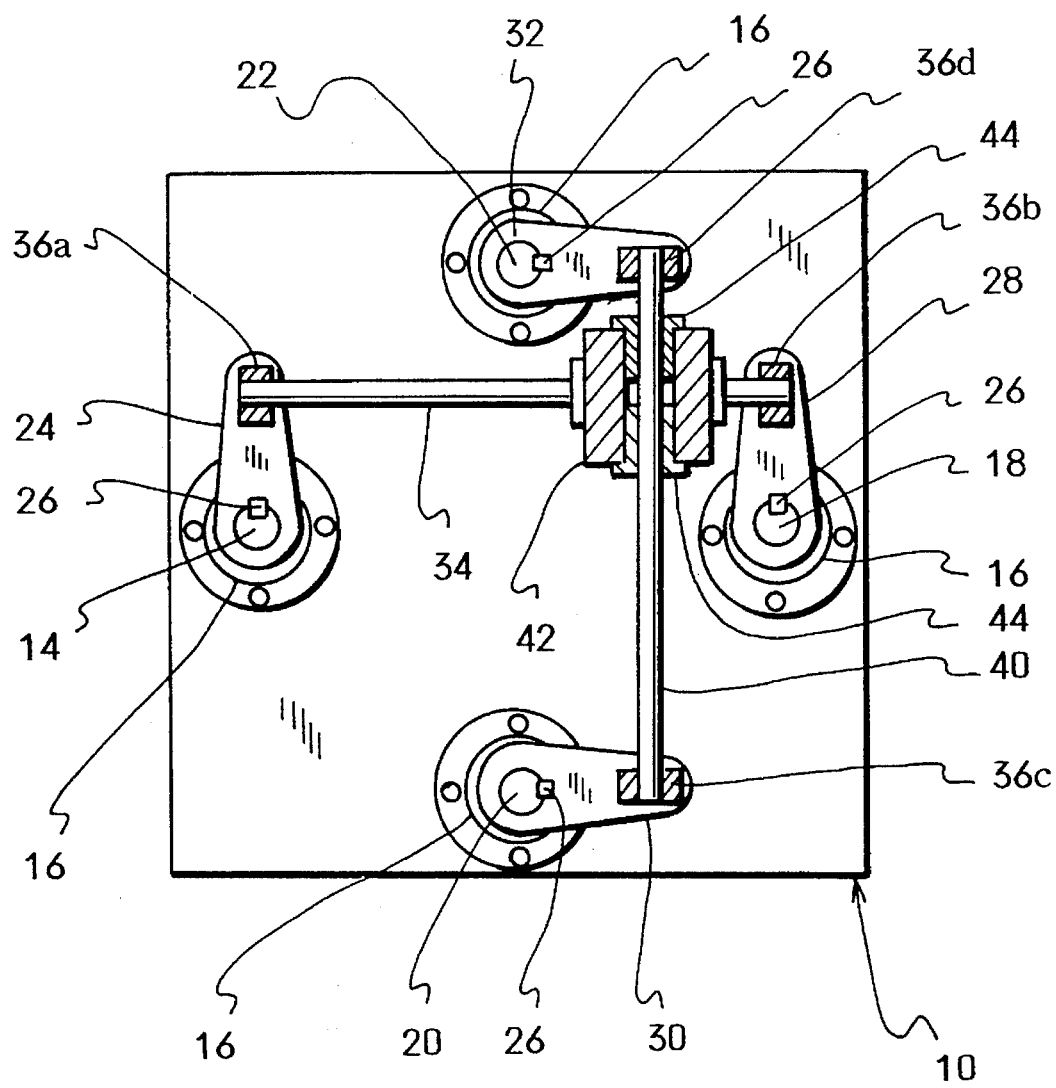
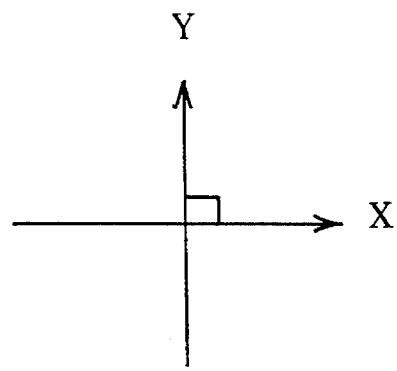

TWO DIMENSIONAL DRIVE SYSTEM

BACKGROUND OF THE INVENTION

The present invention relates to a two dimensional drive system, more precisely relates to a two dimensional drive system, which is capable of moving a moving body in a plane.

A two dimensional drive system, which is capable of moving a moving body in a plane, was disclosed in the U.S. Pat. No. 4,995,277. The conventional two dimensional drive system has: a couple of X-fixed guides being arranged in an X-direction; a couple of Y-fixed guides being arranged in a Y-direction, which is perpendicular to the X-direction; an X-rod whose ends are slidably connected to the Y-fixed guides; a Y-rod whose ends are slidably connected to the X-fixed guides; a moving body being capable of moving on the X-rod and the Y-rod; and a driving mechanism for moving the X-rod and the Y-rod in the X-Y directions. For example, ball screws, timing belts, etc. are employed as the driving mechanism. With the X-Y movement of the X-rod and the Y-rod, the moving body can be moved in the X-Y directions in a rectangular plane, which is rounded by the X- and the Y-fixed guides.

However, the conventional two dimensional drive system has a following disadvantage.

The conventional two dimensional drive system has the ball screws or the timing belts for moving the X-rod and the Y-rod, and the four fixed guides for high speed operation and higher positioning accuracy of the moving body. With this structure, the structure of the two dimensional drive system must be large and complex, and the manufacturing cost thereof must be increased.

SUMMARY OF THE INVENTION

An object of the present invention is to provide a two dimentional drive system having a small and simple structure.

To achieve the object, the two dimensional drive system of the present invention comprises:

a first shaft and a second shaft being mutually separated in a first direction, the first shaft and the second shaft being capable of rotating about their axes;

a third shaft and a fourth shaft being mutually separated in a second direction perpendicular to the first direction, the third shaft and the fourth shaft being capable of rotating about their axes;

a first lever whose one end is fixed to the first shaft, the first lever being capable of rotating together with the first shaft;

a second lever whose one end is fixed to the second shaft, the second lever being capable of rotating together with the second shaft;

a third lever whose one end is fixed to the third shaft, the third lever being capable of rotating together with the third shaft;

a fourth lever whose one end is fixed to the fourth shaft, the fourth lever being capable of rotating together with the fourth shaft;

a first moving guide being arranged in the first direction, one end of the first moving guide being rotatably connected to the other end of the first lever, the other end of the first moving guide being rotatably connected to the other end of the second lever;

a second moving guide being arranged in the second direction, one end of the second moving guide being rotatably connected to the other end of the third lever, the other end of the second moving guide being rotatably connected to the other end of the fourth lever;

a moving body being capable of moving on the first moving guide and the second moving guide;

first driving means for rotating the first shaft; and second driving means for rotating the third shaft.

In the two dimensional drive system of the present invention, the first moving guide and the second moving guide, which constitute a parallel link mechanism, are moved by the first driving means and the second driving means, so that the moving body can be moved in a plane by said simple structure. With such a simple structure, the two dimensional drive system can be small in size. Furthermore, since ball screws, timing belts and fixed guides are not required, manufacturing cost can be reduced.

BRIEF DESCRIPTION OF THE DRAWINGS

Embodiments of the present invention will now be described by way of examples and with reference to the accompanying drawings, in which:

FIG. 2 is a plan view of the two dimensional drive system shown in FIG. 1;

DETAILED DESCRIPTION OF THE PREFERRED EMBODIMENTS

Preferred embodiments of the present invention will now be described in detail with reference to the accompanying drawings.

Figure 1:
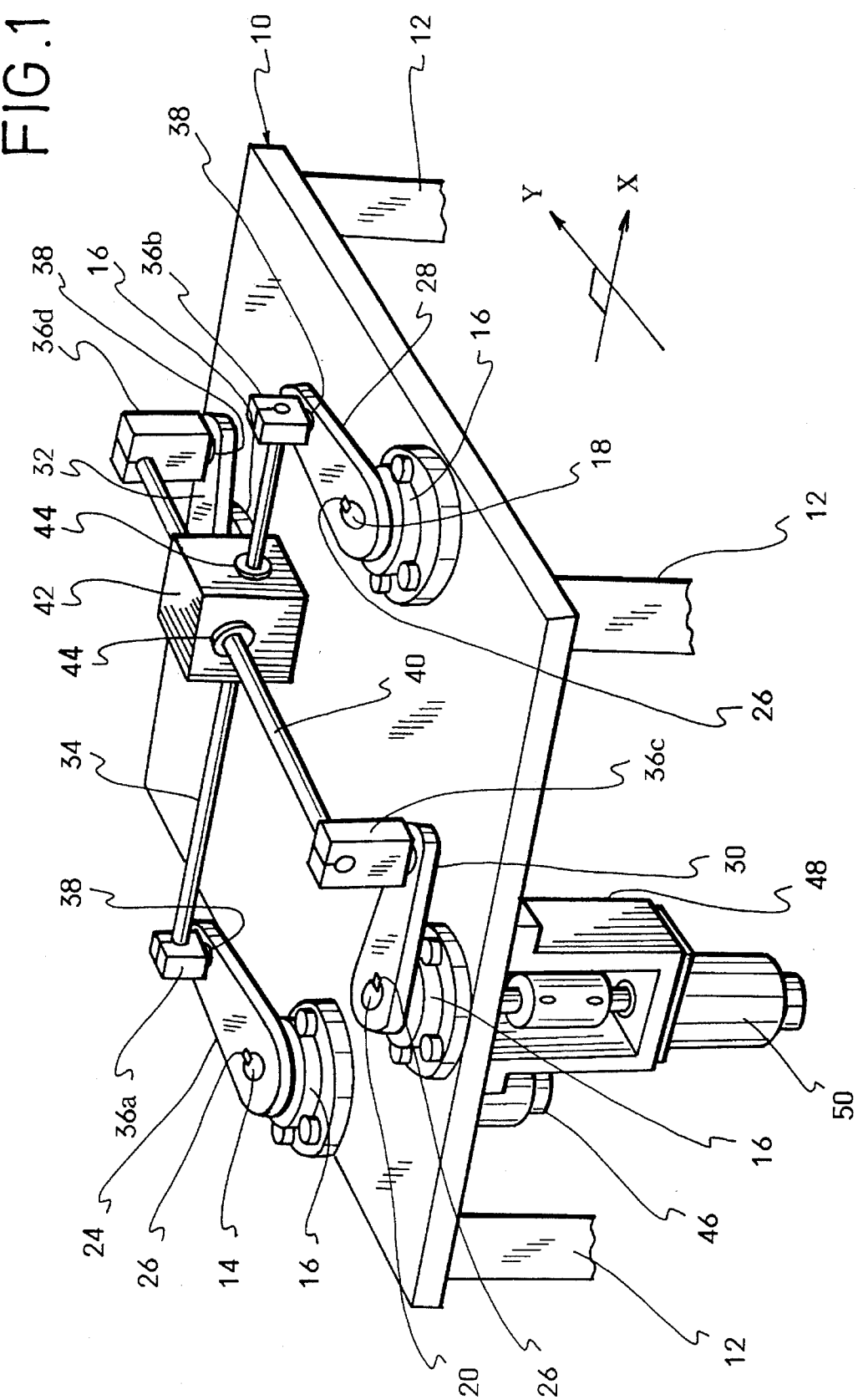
FIG. 1 is a perspective view of an embodiment of the two dimensional drive system of the present invention.
Figure 3:
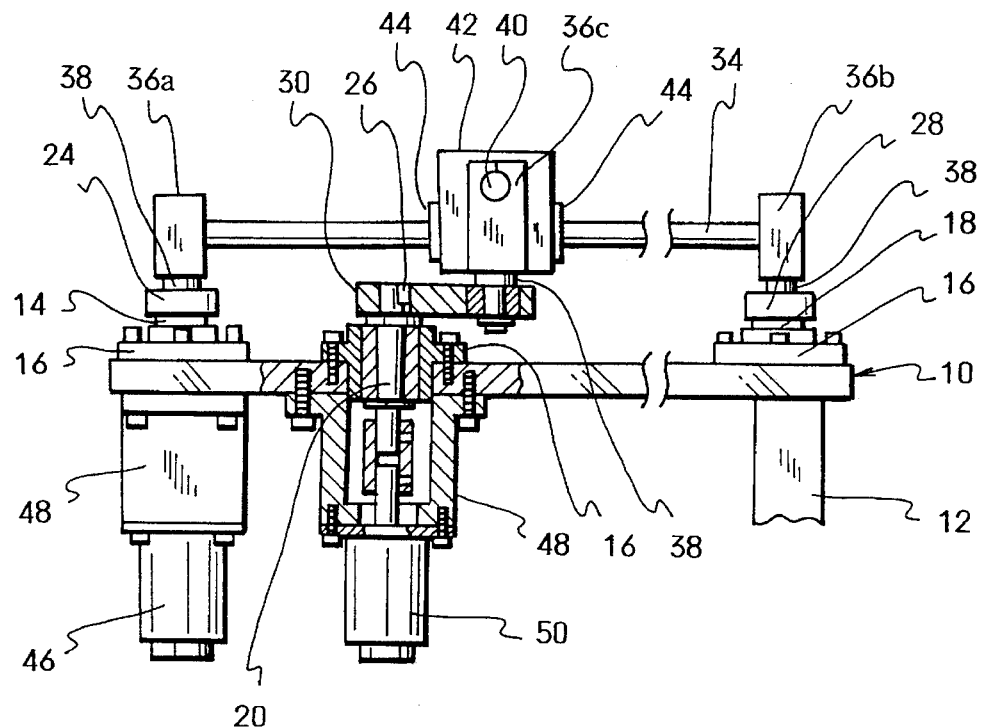
FIG. 3 is a partial sectional front view thereof.

Firstly, a first embodiment will be explained with reference to FIGS. 1–3.

A base 10 is supported by four leg sections 12. The base 10 shown in FIG. 1 is formed into a rectangular plate but its shape may be optionally formed, e.g., a flame shape having a central hollow part.

A first shaft 14 is vertically provided to the base 10. The first shaft 14 is capable of rotating in a bearing 16, which is fixed on the base 10.

A second shaft 18 is vertically provided to the base 10. The second shaft 18 is capable of rotating in a bearing 16, which is fixed on the base 10. The first shaft 14 and the second shaft 18 are mutually separated in an X-direction (a first direction).

A third shaft 20 is vertically provided to the base 10. The third shaft 20 is capable of rotating in a bearing 16, which is fixed on the base 10.

A fourth shaft 22 is vertically provided to the base 10. The fourth shaft 22 is capable of rotating in a bearing 16, which is fixed on the base 10. The third shaft 20 and the fourth shaft 22 are mutually separated in a Y-direction (a second direction) perpendicular to the X-direction.

A one end section of a first lever 24 is fixed to the first shaft 14 with a key 26, so that the first lever 24 is rotated together with the first shaft 14.

A one end section of a second lever 28 is fixed to the second shaft 18 with a key 26, so that the second lever 28 is rotated together with the second shaft 18.

A one end section of a third lever 30 is fixed to the third shaft 20 with a key 26, so that the third lever 30 is rotated together with the third shaft 20.

A one end section of a fourth lever 32 is fixed to the fourth shaft 22 with a key 26, so that the fourth lever 32 is rotated together with the fourth shaft 22.

An X-rod 34 is an example of a first moving guide. Each end section of the X-rod 34 is respectively fixed to connectors 36a and 36b. The connector 36a is rotatably attached to the other end section of the first lever 24 with a shaft section 38; the connector 36b is rotatably attached to the other end section of the second lever 28 with a shaft section 38. The X-rod 34 is maintained parallel to the X-axis. Thus, a parallel link mechanism for moving the X-rod 34 in the Y-direction is constituted by the first lever 24, the second lever 28 and the X-rod 34. Note that, the first moving guide is not limited to the rod, so a linear guide, for example, maybe employed.

A Y-rod 40 is an example of a second moving guide. Each end section of the Y-rod 40 is respectively fixed to connectors 36c and 36d. The connector 36c is rotatably attached to the other end section of the third lever 30 with a shaft section 38; the connector 36d is rotatably attached to the other end section of the fourth lever 32 with a shaft section 38. The Y-rod 40 is maintained parallel to the Y-axis. Thus, a parallel link mechanism for moving the Y-rod 40 in the X-direction is constituted by the third lever 30, the fourth lever 32 and the Y-rod 40. Note that, the second moving guide is not limited to the rod, so a linear guide, for example, may be employed.

The distance between the first shaft 14 and the connector 36a in the first lever 24 is equal to the distance between the second shaft 18 and the connector 36b in the second lever 28. And the distance between the third shaft 20 and the connector 36c in the third lever 30 is equal to the distance between the fourth shaft 22 and the connector 36d in the fourth lever 32.

The X-rod 34 and the Y-rod 40 are pierced through a moving body 42 with bearings 44. The X-rod 34 and the Y-rod 40 are perpendicularly crossed in the moving body 40. Thus, the moving body 42 is capable of moving on the X-rod 34 and the Y-rod 40. Namely, the moving body 42 is moved in the X- and the Y-directions with the movement of the X-rod 34 and the Y-rod 40. Tools, robot heads, measuring equipments, works to be machined or carried, etc. can be attached to or mounted on the moving body 42.

A first motor 46 (first driving means) is a servo motor. The first motor 46 is fixed on a bottom face of the base 10 by an attaching member 48. And the first motor 46 is provided immediately below the first shaft 14. The first motor 46 directly rotates the first shaft 14. When the first shaft 14 is rotated by the first motor 46, the second shaft 18 is also rotated in the same direction at same speed because the second shaft 18 is linked with the first shaft 14. By the rotation of the first shaft 14 and the second shaft 18, the first lever 24 and the second lever 28 are rotated, so that the X-rod 34 can be moved in the Y-direction. Note that, the servo motor is employed as the first driving means in the present embodiment so as to precisely control the rotation of the first shaft 14 but other rotary driving means, e.g., an oil motor, a kick-cylinder, may be employed according to field of use. In the present embodiment, the first driving means rotates the first shaft 14 only but it may rotate the second shaft 18 or may independently and synchronously rotate the both.

A second motor 50 (second driving means) is a servo motor. The second motor 50 is fixed one the bottom face of the base 10 by an attaching member 48. And the second motor 50 is provided immediately below the third shaft 20. The second motor 50 directly rotates the third shaft 20. When the third shaft 20 is rotated by the second motor 50, the fourth shaft 22 is also rotated in the same direction at same speed because the fourth shaft 22 is linked with the third shaft 20. By the rotation of the third shaft 20 and the fourth shaft 22, the third lever 30 and the fourth lever 32 are rotated, so that the Y-rod 40 can be moved in the X-direction. Note that, the servo motor is employed as the second driving means in the present embodiment so as to precisely control the rotation of the third shaft 20 but other rotary driving means, e.g., an oil motor, a kick-cylinder, may be employed according to field of use. In the present embodiment, the second driving means rotates the third shaft 20 only but it may rotate the fourth shaft 22 or may independently and synchronously rotate the both.

In the present embodiment, the first motor 46 and the second motor 50 are controlled by a control section (not shown), which includes a computer system. The rotational direction, the rotational speed and the rotational angle of the first shaft 14 and the second shaft 18 are controlled by controlling the rotational direction, the rotational speed and the rotational angle of an output shaft of the first motor 46. With this control, the moving direction, the moving speed and the moving length of the X-rod 34 can be controlled.

On the other hand, the rotational direction, the rotational speed and the rotational angle of the third shaft 20 and the fourth shaft 22 are controlled by controlling the rotational direction, the rotational speed and the rotational angle of an output shaft of the second motor 50. With this control, the moving direction, the moving speed and the moving length of the Y-rod can be controlled.

By controlling the moving direction, the moving speed and the moving length of the X-rod 34 and the Y-rod 40, the two dimensional moving direction, the moving speed and the moving length of the moving body 42 are controlled. The control section including the computer system may control the movement of the moving body 45 on the basis of a stored data table, which includes the two dimensional moving direction, the moving speed and the moving length of the moving body 42 with respect to the rotational direction, the rotational speed and the rotational angle of the output shafts of the first motor 46 and the second motor 50.

Successively, another embodiment will be explained with reference to FIG. 4. Note that, constituting members, which have been described in the first embodiment, are assigned same symbols, and explanation will be omitted.

In the first embodiment, it is desired that the first shaft 14 and the second shaft 18 are synchronously rotated and the third shaft 20 and the fourth shaft 22 are synchronously rotated for a precise operation of the two dimensional drive system. But it is very difficult to precisely synchronize the two couples of the shafts because the first shaft 14 and the third shaft 20 are directly driven by the motors 46 and 50 and the second shaft 18 and the fourth shaft 22 are not directly driven by the motors. Moreover, since locking force of the motors 46 and 50 does not directly work to the second shaft 18 and the fourth shaft 22, the second shaft 18 and the fourth shaft 22 are apt to rotate by external force even if the motors 46 and 50 are stopping, so that the positioning accuracy of the moving body 42 cannot be raised.

Figure 4:
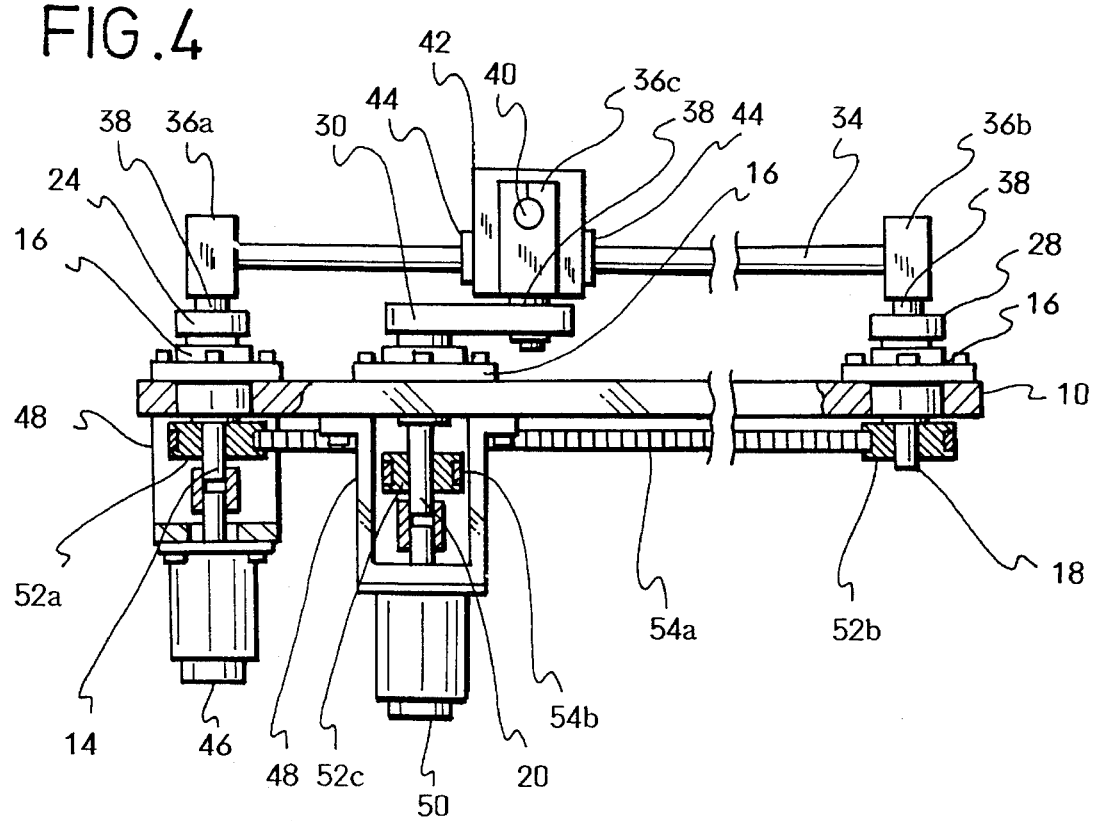
FIG. 4 is a partial sectional front view of another embodiment.

To solve the above described disadvantage of the first embodiment, the two dimensional drive system shown in FIG. 4 has first synchronizing means for synchronously rotating the first shaft 14 and the second shaft 18 and second synchronizing means for synchronously rotating the third shaft 20 and the fourth shaft 22.

The first synchronizing means comprises: a first timing pulley 52a, which is fixed to the first shaft 14; a first timing pulley 52b, which is fixed to the second shaft 18; and a first timing belt 54a, which is engaged with the first timing pulleys 52a and 52b. With the first synchronizing means, the driving force and the locking force of the first motor 46 are equally transmitted to the first shaft 14 and the second shaft 18, so that the first shaft 14 and the second shaft 18 can be synchronously rotated and the second shaft can be securely locked while the first motor 46 stops.

Note that, the first synchronizing means is not limited to the first timing pulleys 52a and 52b and the first timing belt 54a. A chain and a couple of sprockets, for example, can be employed as the first synchronizing means.

The second synchronizing means comprises: a second timing pulley 52c, which is fixed to the third shaft 20; a second timing pulley (not shown), which is fixed to the fourth shaft 22; and a second timing belt 54b, which is engaged with the second timing pulleys 52c . . . With the second synchronizing means, the driving force and the locking force of the second motor 50 are equally transmitted to the third shaft 20 and the fourth shaft 22, so that the third shaft 20 and the fourth shaft 22 can be synchronously rotated and the fourth shaft 22 can be securely locked while the second motor 50 stops.

Note that, the second synchronizing means is not limited to the second timing pulleys 52c . . . and the second timing belt 54b. A chain and a couple of sprockets, for example, can be employed as the second synchronizing means.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A two dimensional drive system, comprising:

a first shaft and a second shaft being mutually separated in a first direction, said first shaft and said second shaft being capable of rotating about their axes;

a third shaft and a fourth shaft being mutually separated in a second direction perpendicular to the first direction, said third shaft and said fourth shaft being capable of rotating about their axes;

a first lever whose one end is fixed to said first shaft, said first lever being capable of rotating together with said first shaft;

a second lever whose one end is fixed to said second shaft, said second lever being capable of rotating together with said second shaft;

a third lever whose one end is fixed to said third shaft, said third lever being capable of rotating together with said third shaft;

a fourth lever whose one end is fixed to said fourth shaft, said fourth lever being capable of rotating together with said fourth shaft;

a first moving guide being arranged in the first direction, one end of said first moving guide being rotatably connected to the other end of said first lever, the other end of said first moving guide being rotatably connected to the other end of said second lever;

a second moving guide being arranged in the second direction, one end of said second moving guide being rotatably connected to the other end of said third lever, the other end of said second moving guide being rotatably connected to the other end of said fourth lever;

a moving body being capable of moving on said first moving guide and said second moving guide;

first driving means for rotating said first shaft; and second driving means for rotating said third shaft.

2. The two dimensional drive system according to claim 1, wherein said first driving means rotates said second shaft.

3. The two dimensional drive system according to claim 1, wherein said first driving means rotates said first shaft and said second shaft.

4. The two dimensional drive system according to claim 1, wherein said second driving means rotates said fourth shaft.

5. The two dimensional drive system according to claim 1, wherein said second driving means rotates said third shaft and said fourth shaft.

6. The two dimensional drive system according to claim 1, wherein said first driving means and said second driving means are motors.

7. The two dimensional drive system according to claim 1, wherein said first moving guide and said second moving guide are rods, which are pierced through said moving body.

8. The two dimensional drive system according to claim 1, further comprising first synchronizing means for synchronously rotating said first shaft and said second shaft.

9. The two dimensional drive system according to claim 8, wherein said first synchronizing means comprises a couple of timing pulleys, which are respectively fixed to said first shaft and said second shaft, and a timing belt, which is engaged with said timing pulleys.

10. The two dimensional drive system according to claim 1, further comprising second synchronizing means for synchronously rotating said third shaft and said fourth shaft.

11. The two dimensional drive system according to claim 10, wherein said second synchronizing means comprises a couple of timing pulleys, which are respectively fixed to said third shaft and said fourth shaft, and a timing belt, which is engaged with said timing pulleys.

12. The two dimensional drive system according to claim 1, further comprising:

first synchronizing means for synchronously rotating said first shaft and said second shaft; and second synchronizing means for synchronously rotating said third shaft and said fourth shaft.

13. The two dimensional drive system according to claim 12, wherein said first synchronizing means comprises a couple of first timing pulleys, which are respectively fixed to said first shaft and said second shaft, and a first timing belt, which is engaged with said first timing pulleys, and wherein said second synchronizing means comprises a couple of second, timing pulleys, which are respectively fixed to said third shaft and said fourth shaft, and a second timing belt, which is engaged with said second timing pulleys.

* * * * *

UNITED STATES PATENT AND TRADEMARK OFFICE
CERTIFICATE OF CORRECTION

PATENT NO. : 5,477,743        Page 1 of 4
DATED : December 26, 1995
INVENTOR(S) : Ken Yanagisawa It is certified that error appears in the above-indentified patent and that said Letters Patent is hereby corrected as shown below:

```
On the Title Page, [57] ABSTRACT
     Line 1, delete "The object of the present invention
          is to provide a"
     Line 1, before "two" insert -- A --
     Lines 2 and 3, delete "small and simple structure.
          The two dimensional drive system comprises: a"
     Line 4, change "whose" to -- including --
     Line 4, delete "is"
     Line 5, change "whose" (both occurrences) to
          -- including --
     Line 5, delete "is"
     Line 6, delete "is"
     Line 6, delete ";" (semicolon) and before "a" insert
          -- and --
     Line 6, change "whose" to -- including --
     Line 7, delete "is"
     Line 7, change "; a" to -- . A --
     Line 7, change "whose" to -- includes --
     Line 8, delete "is"
     Lines 8 and 9, change "and whose" to -- with --
```

UNITED STATES PATENT AND TRADEMARK OFFICE
CERTIFICATE OF CORRECTION

PATENT NO. : 5,477,743
DATED : December 26, 1995
INVENTOR(S) : Ken Yanagisawa

It is certified that error appears in the above-indentified patent and that said Letters Patent is hereby corrected as shown below:

```
          Line 9, delete "is"
          Line 10, change "; a" to -- . A --
          Line 10, change "whose" to -- includes --
          Line 11, delete "is"
          Lines 11 and 12, change "and whose" to -- with --
          Line 12, delete "is"
          Line 13, change "; and a" to --. A"
          Line 13, change "being" to -- is provided which
                  is --

Column 1, line 11, change "was" to -- is --
          line 33, change "must be" to -- is --
          line 34, change "must be" to -- is --
Column 2, line 65, change "A one" to -- One --
Column 3, line 18, change "is constituted by" to
                  -- includes --
          line 21, change "maybe" to -- may be --
          line 37, change "And" to -- In addition, --
          line 49, change "works" to -- workpieces --
          line 53, change "And the" to -- The --
          line 57, before "same" (second occurrence)
                  insert -- the --
          line 65, before "field" insert -- the --
```

UNITED STATES PATENT AND TRADEMARK OFFICE
CERTIFICATE OF CORRECTION

PATENT NO. : 5,477,743

DATED : December 26, 1995

INVENTOR(S) : Ken Yanagisawa

It is certified that error appears in the above-indentified patent and that said Letters Patent is hereby corrected as shown below:

```
Column 4, line 1, delete "the"
          line 2, after "both" insert -- shafts --
          line 5, change "And the" to -- The --
          line 10, before "same" insert -- the --
          line 18, before "field" insert -- the --
          line 21, delete "the"
          line 21, after "both" insert -- shafts --
          line 53, before "same" insert -- the --
          line 53, before "explanation" insert
                  -- an --
          Line 53, after "explanation" insert
                  -- thereof --
          line 62, before "locking" insert -- a --
          line 63, change "to" to -- on --
          line 66, change "stopping," to -- coming to a
          stop --

Column 5, Claim 1
          lines 55, 58, 61 and 65, change "whose" to
          -- having --
```

UNITED STATES PATENT AND TRADEMARK OFFICE
CERTIFICATE OF CORRECTION

PATENT NO. : 5,477,743
DATED : December 26, 1995
INVENTOR(S) : Ken Yanagisawa

It is certified that error appears in the above-indentified patent and that said Letters Patent is hereby corrected as shown below:

Column 5, lines 55, 58, 61 and 65, delete "is"

Signed and Sealed this

Seventeenth Day of September, 1996

Attest:

BRUCE LEHMAN

Attesting Officer

Commissioner of Patents and Trademarks